United States Patent
Buller et al.

(10) Patent No.: US 10,248,973 B1
(45) Date of Patent: Apr. 2, 2019

(54) AUTOMATED SELECTION OF BIDDERS FOR ONLINE ADVERTISEMENTS USING COLLABORATIVE BIDDING RULES

(71) Applicant: Marin Software Incorporated, San Francisco, CA (US)

(72) Inventors: Jordan Buller, San Francisco, CA (US); Bradford Flora, San Francisco, CA (US); Francois Lagier, San Francisco, CA (US); Andrew Bissell, San Francisco, CA (US); Tony Chan, Chicago, IL (US)

(73) Assignee: Marin Software Incorporated, San Francisco, CA (US)

( * ) Notice: Subject to any disclaimer, the term of this patent is extended or adjusted under 35 U.S.C. 154(b) by 654 days.

(21) Appl. No.: 14/657,675

(22) Filed: Mar. 13, 2015

(51) Int. Cl.
*G06Q 30/00* (2012.01)
*G06Q 30/02* (2012.01)
*G05B 19/418* (2006.01)

(52) U.S. Cl.
CPC .............................. *G06Q 30/0275* (2013.01)

(58) Field of Classification Search
None
See application file for complete search history.

(56) References Cited

U.S. PATENT DOCUMENTS

| | | | |
|---|---|---|---|
| 2002/0107807 A1* | 8/2002 | Ketonen | G06Q 10/10 705/51 |
| 2011/0270686 A1* | 11/2011 | Patwa | G06Q 30/0269 705/14.66 |
| 2015/0242648 A1* | 8/2015 | Lemmey | G06F 21/6218 726/30 |

OTHER PUBLICATIONS

"An overview of computational challenges in online advertising". Richard E. Chatwin. SBN (Electronic):bsp;978-1-4799-0178-4. Aug. 14, 2013. Published in: 2013 American Control Conference (pp. 5990-6007). (Year: 2013).*

* cited by examiner

*Primary Examiner* — Maria V Vanderhorst
(74) *Attorney, Agent, or Firm* — Fenwick & West LLP

(57) ABSTRACT

Approaches for collaborative advertising bidding comprise receiving, from an ad exchange, a bid request for an advertisement space for a viewing user. The approaches further comprise retrieving logged data associated with the viewing user, the logged data corresponding to the viewing user's online exposure to web content including at least one of commercial webpages, online representations of services or products having purchase information, and advertisements. A first advertiser and a second advertiser who have entered into an advertising collaborating relationship to respond to bid requests are identified. A determination is made as to whether a portion of the retrieved logged data for the viewing user is associated with the first advertiser or with the second advertiser. Additionally, based on the determining, one of the first advertiser and the second advertiser is selected to submit a bid for the advertisement space in response to the bid request.

20 Claims, 7 Drawing Sheets

AUTOMATED SELECTION OF BIDDERS FOR ONLINE ADVERTISEMENTS USING COLLABORATIVE BIDDING RULES

BACKGROUND

1. Field of Art

The present disclosure generally relates to the field of online sales, online advertising, and bid selection in an internet-based advertising environment.

2. Description of the Related Art

In an online advertising system, advertisers contract with an advertisement exchange system (alternatively referred to herein as an "ad exchange"), such as DOUBLECLICK or MICROSOFT MEDIA NETWORK, to run their advertisements. Typically, an advertiser specifies an amount of money ("bid") that the advertiser is willing to pay if the advertising publisher selects its advertisements for display rather than those of another advertiser, and a user clicks on the displayed advertisement or otherwise designates it for further viewing. Bids are generally calculated by the advertiser based on the expected probability of the occurrence of a further desired action ("conversion event") taking place. The conversion event can be, for example, the online purchase of a product associated with the advertisement. The advertisement exchange in turn conducts a bid auction for a given advertising opportunity, selecting an advertisement of the advertisers who bid in part based on a comparison of the bid values.

In this context, having additional information about a particular advertising opportunity could be of benefit to advertisers when determining whether it is in its interests to bid for that advertising opportunity. It would be desirable to facilitate the collection of such information and to use the information to improve the advertising decisions of advertisers, potentially allowing multiple advertisers to benefit from the information, while still properly rewarding the advertisers from whom the information was obtained.

BRIEF SUMMARY

In some embodiments, a processor-implemented method comprises receiving, from an ad exchange, a bid request for an advertisement space for a viewing user; retrieving logged data for the viewing user; determining that the logged data was obtained at least in part from a first advertiser; determining, using the logged data, that the viewing user satisfies targeting criteria of the first advertiser and of a second advertiser; determining that the first advertiser and the second advertiser have entered into an advertising collaborative relationship; identifying collaboration rules of the first advertiser for the advertising collaborative relationship; evaluating the collaboration rules using the logged data; and based on the evaluating, selecting either the first advertiser or the second advertiser to submit a bid for the advertisement space.

In some embodiments, a non-transitory computer-readable storage medium storing instructions executable by a processor, the instructions comprising instructions for, receiving, from an ad exchange, a bid request for an advertisement space for a viewing user; instructions for, retrieving logged data for the viewing user; instructions for, determining that the logged data was obtained at least in part from a first advertiser; instructions for, determining, using the logged data, that the viewing user satisfies targeting criteria of the first advertiser and of a second advertiser; instructions for, determining that the first advertiser and the second advertiser have entered into an advertising collaborative relationship; instructions for, identifying collaboration rules of the first advertiser for the advertising collaborative relationship; instructions for, evaluating the collaboration rules using the logged data; and instructions for, based on the evaluating, selecting either the first advertiser or the second advertiser to submit a bid for the advertisement space.

In some embodiments, a method comprises receiving, from an ad exchange, a bid request for an advertisement space for a viewing user; retrieving logged data associated with the viewing user; determining that a first advertiser and a second advertiser have entered into an advertising collaborative relationship to respond to bid requests; determining whether a portion of the retrieved logged data for the viewing user is associated with the first advertiser or with the second advertiser; and based on determining whether the portion of the retrieved logged data for the viewing user is associated with the first advertiser or with the second advertiser, selecting, as an advertiser to submit a bid for the advertisement space in response to the bid request, one of the first advertiser and the second advertiser.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
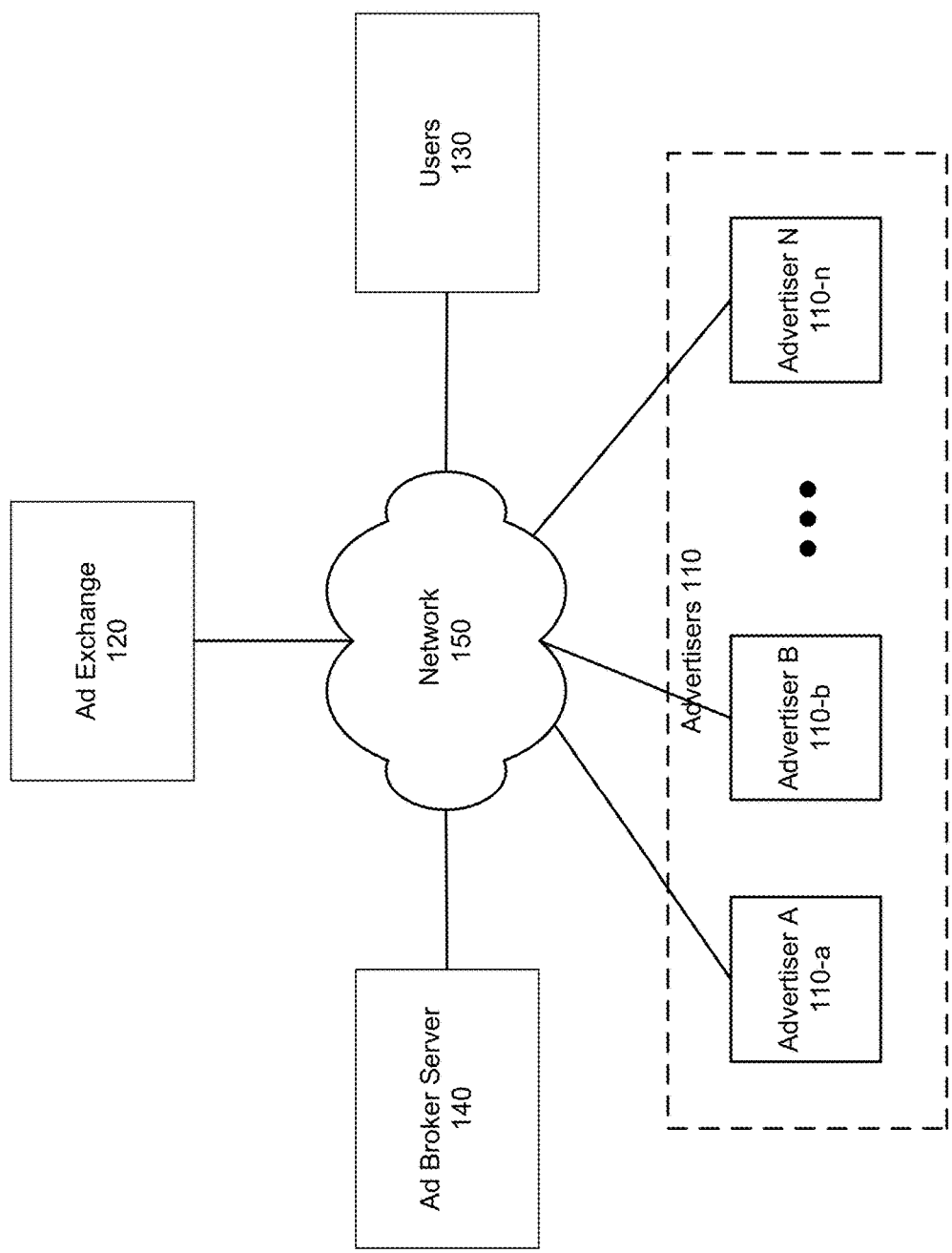
FIG. 1 illustrates a computing environment in which online advertising takes place, according to one embodiment.

FIG. 1 illustrates a computing environment in which online advertising takes place, according to one embodiment. The computing environment includes advertisers 110, ad exchange 120, users 130, ad broker server 140, and network 150.

Advertisers 110 (including Advertiser A 110-a, Advertiser B 110-b, and Advertiser N 110-n) wish to display their advertisements in association with online content, such as the search results provided by a search engine, the user-submitted information provided by a social network, and the like. These may include advertisements for the advertiser's own products or services, or advertisements that the advertisers display on behalf of a different organization. The advertisements are associated with a bid amount representing a price to be paid 110 to an ad exchange 120 in return for displaying the advertisement to a viewing user or if the viewing user is engaged with the advertisement.

When an advertisement opportunity arises—that is, when there is an "advertisement space" to be filled as part of content shown to a viewing user, either in a predefined region of a webpage being viewed by the viewing user, as a separate display (e.g., a "pop-up" or a separate browser tab) in addition to a requested webpage, or as a prelude to the requested page—an ad exchange 120 selects one or more advertisements for display within the advertisement space. Typically, the selected advertisements are associated with content that is relevant to the content or webpage requested by the viewing user or that is otherwise determined to be relevant to the viewing user based on the user's online viewing patterns and activities. For example, an advertisement opportunity may arise in response to the triggering of particular terms entered by a viewing user (e.g., a search field of a search engine). When an ad opportunity arises, the ad exchange 120 may solicit bids for an advertisement space directly from advertisers 110, or from ad broker servers 140 acting on behalf of the advertisers. Based on the received bids, the ad exchange 120 may run ad auctions to select, from among the participating submissions (i.e., bids and their corresponding advertisements), an appropriate advertisement for display to the viewing user in the advertisement space. In some embodiments, based on known conversion rates and bids for the advertisements, the ad exchange 120 can select, from the pool of candidate advertisements submitted by advertisers 110, a set of advertisements generating the highest expected revenues for the advertising publisher.

The selected advertisements might then be displayed as graphical or textual links with associated textual descriptions located within a sponsored links section of the search results, for example, or other areas. Activating the links, such as by clicking on them, leads a web browser of the user to display the page designated by the link, such as a page where the associated products can be purchased. Such activation of an advertisement link associated with a particular term is hereinafter referred to as "clicking" the advertisement or its associated term.

In another scenario, the ad exchange 120 selects advertisements not in response to a query, but in response to the selection of a web page or other electronic content of a content provider for which the content provider has contracted with the ad exchange to provide advertisements. Then, based on terms associated with the content of the web page, the ad exchange 120 selects advertisements for display on the web page, the selection of the advertisements again being performed so as to maximize expected revenue for the advertising publisher. In this scenario, the selected advertisements might again be displayed as links accompanied by textual descriptions, located adjacent to the main content areas of the web page.

Users 130 represent consumers of internet content—individuals who view web content, or interact with web content by selecting content, navigating through content, inputting content, sending and receiving web content, and so on. Such users are frequently exposed to and often engage with paid or sponsored content (such as advertisements) that are provided to them by the ad exchange 120. Advertisers 110 frequently target their paid content to users 130 who meet advertisement criteria or meet eligibility criteria for being exposed to advertisement content.

The ad broker server 140 acts as an intermediary between the advertisers 110 and the ad exchange 120, handling the details needed to enable the advertisers 110 to best meet their advertising goals. In particular, the ad broker server 140 enables advertisers 110 to collaborate in submitting a bid for an advertisement space for a user 130. When the ad broker server 140 is notified, by the ad exchange 120, of a bid opportunity for a viewing user, the ad broker server 140 identifies a set of advertisers 110 that have advertising criteria that match properties of the bid opportunity. In the case where two or more of these identified advertiser have entered into a collaborative relationship defined by mutually agreed upon collaboration rules, the ad broker server 140 applies the collaboration rules to determine which of the collaborating advertisers should submit a bid for the ad opportunity.

By responding in real time to potentially enormous numbers of bid requests from one or more ad exchanges in real time; by obtaining, computing and leveraging advertising statistics—in part using user data automatically obtained from advertiser websites across the internet; and by evaluating rule satisfaction for collaborating advertisers in order to best respond to the bid requests, the ad broker server 140 enables advertising systems to obtain new efficiencies not possible in traditional (e.g., pre-internet) advertising systems.

Communication between the advertisers 110, the ad exchange 120, the users 130, and the ad broker server 140 may be accomplished via a network 150. The network 150 is typically the Internet, but may be any network, including but not limited to a LAN, a MAN, a WAN, a mobile wired or wireless network, a cloud computing network, a private network, or a virtual private network.

Figure 2:
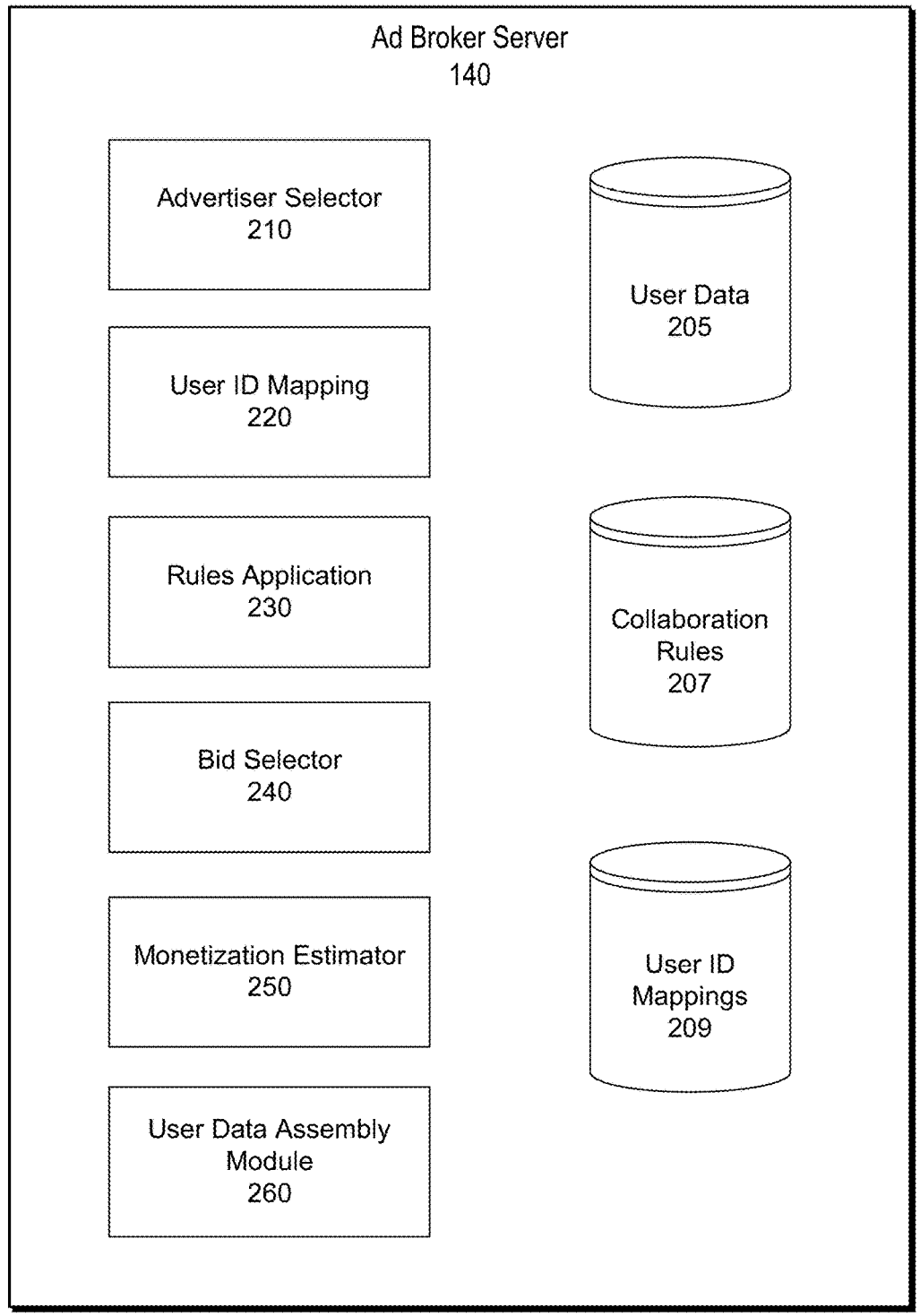
FIG. 2 is a high-level block diagram illustrating a detailed view of the ad broker server of FIG. 1, according to one embodiment.

FIG. 2 is a high-level block diagram illustrating a detailed view of the ad broker server 140 of FIG. 1, according to one embodiment.

User data 205 represents a data store that contains user data retrieved by the ad broker server 140 from various advertisers 110. The user data includes observations and statistics about the online activities of various users on websites hosted by the advertisers 110. Scripts executing at the websites hosted by the advertisers 110 log such observations about the users visiting and browsing web content on the advertisers' web sites. In particular, the user data corresponds to the users' online exposure to or engagement with web content including commercial webpages, online representations of services or products having purchase or marketing information, online advertisements, or sponsored web content. The user data also identifies the users associated with the online activities. Examples of user data in the user data 205 include identifiers of web sites or web pages visited, frequency of visitation, time spent on each site, products or services purchased online, various spending statistics, ads viewed, types and numbers of ad engagement (clicks, conversions, and the like). Each piece of data about a user includes an indication of the advertiser 110 who "owns" that piece of data (e.g., the advertiser responsible from the website from that the user visited and from which the data was obtained). Table 1 contains an illustration of the nature of user data stored in the user data 205. In this example, user data for User A was retrieved from Advertiser A (e.g., Brand A) and user data for User M was retrieved from Advertiser B (e.g., Brand B). An item of user data 205 also indicates, in addition to the data itself, the respective user and respective advertiser to which the data correspond.

TABLE 1

Table illustrating user data retrieved by the ad broker server from an advertiser

| User ID | Advertiser ID | User Data |
|---|---|---|
| User A | Advertiser A (e.g., Brand A) | Websites visited: Home page, Product catalog for shoes, Product catalog for tennis equipment<br>Number of web visits: 20<br>Frequency of web visits: 2 per month<br>Products purchased: Women's tennis shoes, Tennis backpack, Women's tennis skirt<br>Average cost of products purchased: $70.80<br>Number of Ad Clicks: 2<br>Average Winning Bid: $2.75 cpm<br>Average Ad Impressions per Month: 10 |
| User M | Advertiser B (e.g., Brand B) | Websites visited: Home page, Product catalog for hoodies, Product catalog for jacket<br>Number of web visits: 50<br>Frequency of web visits: 6.5 per month<br>Products purchased: Women's hoody, Women's fleece jacket<br>Average cost of products purchased: $60.50<br>Number of Ad Clicks: 1<br>Average Winning Bid: $1.65 cpm<br>Average Ad Impressions per Month: 22 |

Collaboration rules 207 represents a data store that stores collaboration rules received from collaborating advertisers that have agreed to enter into a "collaborative relationship." These rules define how competition for bids is handled between two or more advertisers who have mutually agreed to enter the collaborative relationship. In some embodiments, the collaboration rules that are retrieved and applied are those of the advertiser that "owns" the data that caused the collaborating advertisers to be selected as candidates. Collaboration rules between two or more advertisers sharing a collaborative relationship include a set of predefined conditions that are evaluated in response to a specified bid request/opportunity to identify which if any of the two or more advertisers would be selected to submit a bid in response to the specified bid. In some embodiments, each collaborating advertiser in the "collaborative relationship" designates its own rules—the rules may be symmetric or asymmetric between two collaborating advertisers. Table 2 illustrates one example a set of asymmetric collaboration rules between two advertisers (Advertiser A and Advertiser B who have entered into a collaborative relationship).

TABLE 2

Table illustrating collaboration rules between advertisers sharing a collaborative relationship

| Advertiser A rules | Advertiser B rules |
|---|---|
| If data belongs to Advertiser A,<br>(i) apply rules defined by advertiser A,<br>(ii) define/retrieve advertiser A's forfeiture conditions (e.g., $CF_A$, the price charged to B for forfeiture on A's part - this could be a flat CPM price to be paid from B to A, or it could be paid out for clicks/conversion which would then have a model to compute based on history),<br>(iii) determine value of winning bid for viewing user ($CW_A$, the monetary value of winning the bid - this would normally be a matter of determining the probabilistic/proportional part of each bid that leads to a conversions or other forms of revenue - e.g., (#conversions per 1000 impressions) * (avg conversion value)/(1000 impressions) ),<br>(iv) forfeit bid opportunity and/or share user data if $CF_A > CW_A$<br>(v) share data and submit bid if $CF_A < CW_A$<br>If data belongs to Advertiser B,<br>(i) apply rules defined by advertiser B,<br>(ii) define/retrieve advertiser A's data purchase conditions (e.g., $CP_A$, the cost to A for purchasing the viewing user's data from B - e.g., a margin on top of the media cost or it could be a flat CPM, along the lines of $10 per thousand impressions, etc.),<br>(iii) determine value of winning bid for viewing user ($CW_A$, the monetary value of winning the bid),<br>(iv) purchase data if $CW_A > CP_A$<br>If data belongs to both advertisers A and B,<br>(i) share A's data with B only if A's rules are applied,<br>(ii) apply A's rules, forfeit bid opportunity and/or share user data if $CF_A > CW_A$ | If data belongs to Advertiser B,<br>(i) apply rules defined by advertiser B,<br>(ii) define/retrieve advertiser B's forfeiture conditions (e.g., $CF_B$, the price charged to A for forfeiting on B's part),<br>(iii) determine value of winning bid for viewing user ($CW_B$, the monetary value of winning the bid),<br>(iv) forfeit bid opportunity and/or share user data if $CF_B > CW_B$<br>(v) withhold user data and submit bid if $CF_B < CW_A$<br>If data belongs to Advertiser A,<br>(i) apply rules defined by advertiser B,<br>(ii) define/retrieve advertiser B's data purchase conditions (e.g., $CP_B$, the cost to A for purchasing the viewing user's data from B),<br>(iii) determine value of winning bid for viewing user ($CW_B$, the monetary value of winning the bid),<br>(iv) purchase data if $CW_B > CP_B$<br>If data belongs to both advertisers A and B,<br>(i) share A's data with B only if A's rules are applied,<br>(ii) apply A's rules, regardless |

Other rules are possible, as well. For example, an advertiser 110 could specify that in a particular instance (e.g., when the data indicates a particular condition, such as that the viewing user had previously shopped for women's purses) it wishes to submit a bid, regardless of whether other advertisers are willing to pay it more for forfeiting the bid opportunity than it is expected to gain from bidding (i.e., whether $CF_A < CW_A$). As another possible rule, if Advertiser A has already shown many ads to the individual user for that day (a frequency cap), then Advertiser A may forfeit the bid opportunity. In some embodiments, the collaboration rules are categorized into multiple classes of conditions based on a nature of the constraint imposed by the rules and type of condition being evaluated. Examples of such classes include rule application conditions, opportunity forfeiture conditions, opportunity monetization conditions, data sharing conditions, data purchase conditions, and so on. Rule application conditions may specify whose rules should be applied for a specific bid opportunity. Opportunity forfeiture conditions may specify under what circumstances (e.g., mathematical relationship that should be evaluated and satisfied between monetary value of the opportunity and remuneration received in lieu of the forfeiture) a bid opportunity be forfeited by the advertiser despite the retrieved data being "owned" by the advertiser. Opportunity monetization conditions may specify (e.g., in the form of a mathematical relationship or formula) how the monetary value of a bid opportunity for a viewing user should be calculated. Data sharing conditions may specify circumstances under which an advertiser may wish to share (e.g., sell for a specified minimum remuneration received in return for the sharing) data logged about a viewing user with another collaborating advertiser when a bid opportunity arises for the viewing user. Data purchase conditions may specify under what conditions (e.g., purchase price, monetary value of the bid opportunity) an advertiser may wish to purchase data logged about a viewing user, when the data is "owned" by another collaborating advertiser.

When a bid request is received from the ad exchange 120, an advertiser selector module 210 identifies advertisers 110 that are to be candidates for responding to (submitting bids in response to) the received bid request. The selected advertisers may include two or more advertisers who have previously elected to enter a collaborative relationship in which they work together to potentially share ad opportunities and data about viewing users and the engagement of these users with online content. Advertisers 110 are typically more likely to elect to enter into a collaborative relationship if they are not directly competing (e.g., do not have competing products) but rather operate in related market segments. To identify the candidate advertisers 110 for a given bid request, the advertiser selector module 210 compares the information known about the viewing user that triggered the bid request, as previously retrieved and logged in user data 205, to the ad targeting criteria of the various advertisers. Based on the comparison, the advertiser selector 210 identifies advertisers whose targeting criteria match the user data; this may include two or more advertisers 110 who have previously entered into a collaborative relationship.

When a bid request is received for a viewing user, the bid request may identify the viewing user using a user ID of the viewing user on the ad exchange 120. However, the ad broker server 140 typically does not have direct access to ad exchange's data about users, and thus the user ID of the ad exchange is not in itself sufficient for the ad broker server 140 to ascertain information about the viewing user based on the ad exchange's user ID. Thus, in one embodiment a user ID mapping module 220 performs, for any new user for whom a bid request is received, user ID matching to ascertain an identity of the new user corresponding to the bid request received from the ad exchange 120. To this end, in some embodiments, user ID mapping module 220 performs cookie synchronization with the ad exchange 120 to correlate the two distinct user IDs for a given user respectively used by the ad exchange 120 and the ad broker server 140. In some instances, if the ad broker server 140 identifies a new user (one for whom there isn't a previously stored ID mapping), the ad broker server 140 "syncs" with the ad exchange 120 by redirecting the new user's web browser to the ad broker server, thereby obtaining an identity for that new user. A mapping is created of ad broker server user IDs and ad exchange user IDs which can be stored either on the ad exchange server in a database accessible by the ad broker server or (as depicted in FIG. 2 by the user ID mappings 209) at the ad broker server.

When the advertiser selector module 210 has determined that two or more advertisers having a collaborative relationship are candidates for a given bid opportunity, the need arises to choose how the bids of those collaborating advertisers should be handled. Accordingly, for each set of candidate advertisers that are in a collaborative relationship, a rules application module 230 retrieves corresponding collaboration rules from the collaboration rules data store 207 and applies the collaboration rules to determine which one of a set of collaborating advertisers is to be selected to respond to the bid request received from the ad exchange 120. Thus, the collaboration rules determine the behavior of the ad broker server 140 when determining which advertiser should bid on for a given advertisement space. The selected advertiser then submits a bid for the advertisement space in response to a bid request.

As stated above, the collaboration rules that are retrieved and applied are those of the advertiser that "owns" the data that caused the collaborating advertisers to be selected as candidates. For example, assume that the advertiser selector 210 determined, based on data obtained from the viewing user when the viewing user was browsing a website of a first advertiser, that the viewing user had previously viewed women's athletic shoes (the first advertiser being considered the "owner" of the data since it was derived from activity on its website). Further assume that the first advertiser and a second advertiser were among those selected as candidates for the corresponding bid opportunity because the property "viewer of women's athletic shoes" was among both of their ad targeting criteria, and that the second advertiser was permitted also to be one of the candidates because it was in a collaborative relationship with the first advertiser (the owner of the data that led to its selection). In this example, the collaboration rules applied are those of the first advertiser, since it was the owner of the data leading to selection as an advertising candidate and thus should be given preferential treatment. The collaboration rules of the first advertiser could specify different outcomes, e.g., those listed above, such as that the ad broker server 140 will submit the bid of the first advertiser but not of the second advertiser, or that the first advertiser will forfeit the opportunity to bid in exchange for a payment by the second advertiser, or the like. In other words, the rules application module 230 applies predefined collaboration rules associated with the collaborating advertisers selected by the collaborating advertiser selector 210 in conjunction with retrieved logged data about the viewing user to preferentially select one of the selected advertisers over the other for responding to the bid request.

When the ad broker server 140 receives a bid request from the ad exchange 120 for a specific viewing user, the bid selector 240 determines the bid that is to be submitted to the ad exchange 120 in response to the received bid request. The bid selector 240 receives, from the collaborating advertiser selector 210 and the rules application module 230, information regarding the advertiser that was selected to respond to the bid request. The bid selector 240 then determines an appropriate bid that the selected advertiser should submit for the ad opportunity corresponding to the viewing user.

Monetization estimator 250 obtains the collaboration rules for an advertiser from whom user data for a given viewing user was received, and applies the forfeiture conditions provided in the rules to compute the monetary value of forfeiture of a bid opportunity on the part of the advertiser who owns the user data for a viewing user, to a collaborating advertiser (e.g., advertiser B) who does not own that data. For example, if user data for a certain viewing user was owned by (obtained from) advertiser A, then monetization estimator 250 determines advertiser A's forfeiture conditions (e.g., $CF_A$, the price charged to B for forfeiture on A's part), advertiser B's data purchase conditions (e.g., $CP_B$, the cost to B for purchasing the viewing user's data from A), and a monetary value of a winning bid for viewing user ($CW_A$, the monetary value of winning the bid). Monetization estimator 250 then determines, for instance, that advertiser A may forfeit the bid opportunity in favor of advertiser B if $CF_A > CW_A$ and/or share user data with advertiser B if $CP_B > CW_A$. Monetization estimator 250 can use a variety of approaches to determine values for $CF_A$, $CW_A$, and $CP_A$. For example, and as described in Table 2, $CF_A$ (the price charged to B for forfeiture on A's part) is defined in one embodiment as a flat CPM price to be paid from B to A; in another embodiment, it is calculated for individual clicks or conversions using a trained model, the model trained based on historical conversions and click through rates. $CP_A$ (the cost to A for purchasing the viewing user's data from B) in one embodiment is a margin exceeding (over or on top of) the media cost; in another embodiment, it is a flat CPM, such as $10 per thousand units (impressions, etc.).

Similarly, $CW_A$ (the monetary value of winning the bid) could be determined as the probabilistic or proportional part of each bid that leads to a conversion or any other suitable form of revenue. An example is provided in equation 1:

$$CW_A = (\text{\#conversions per 1000 impressions}) * (\text{avg conversion value})/(1000 \text{ impressions}) \quad \text{(Eqn 1)}$$

In order to make the best determination of which advertisers 110 should bid, the rules application module 230 retrieves the appropriate data on which to make the determination. Accordingly, the ad broker server 140 comprises a user data assembly module 260 that obtains information about users and aggregates the obtained information in user data 205. User data retrieval module 260 retrieves data known about online users (such as users 130 of FIG. 1) from advertisers 110. Such data includes observations and statistics about the users' online activities. Scripts executing at the advertisers 110 log such observations about the users visiting and browsing web content on the advertisers' web sites. In some embodiments, ad broker server 140 makes scripts available to log online activity data about users. Advertisers 110 embed in, or otherwise use the scripts on, their webpages in order to record data (e.g., web activity) about users. When a user visits a webpage, the scripts associated with that webpage send the data to the ad broker server 140, which logs the data, and an identification of the advertiser 110 from which the data is received as the "owner" of the data. User data retrieval module 260 receives and optionally processes this data at the ad broker server 140 for further storage and future retrieval.

The ad broker server 140 optionally comprises an advertiser application programming interface (API), e.g., a web service or a web-based interface, by which an advertiser 110 can interact with the ad broker server 140 and with other advertisers 110 to set up the collaborative relationships, to participate in a collaborative bid submission process for a viewing user, and the like.

Figure 3:
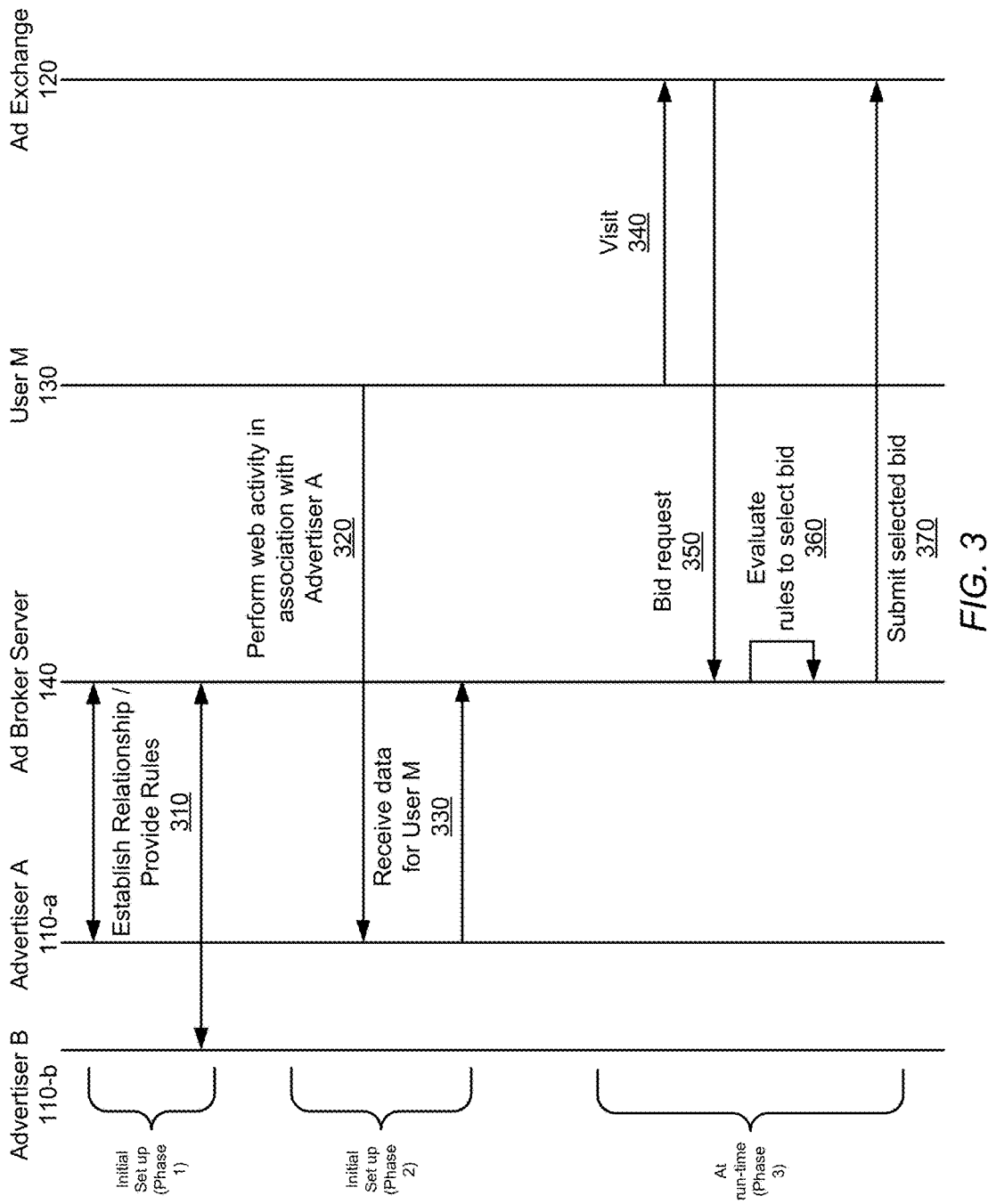
FIG. 3 is a sequence diagram illustrating interactions between various entities of the computing environment of FIG. 1 when advertisers collaborate to submit a bid request for an advertisement space, according to one embodiment.

FIG. 3 is a sequence diagram illustrating interactions between various entities of the computing environment of FIG. 1 when advertisers collaborate to submit a bid request for an advertisement space, according to one embodiment.

During the initial set up (phase 1) of FIG. 3, a set of collaborating advertisers (e.g., Advertiser A and Advertiser B) set up accounts with the ad broker server 140. During this phase, the collaborating advertisers establish relationships 310 with each other, e.g., using the user interfaces of FIGS. 6A and 6B, described later below. The collaborating advertisers also provide 310, define, and affirm collaboration rules defining the nature of their collaborative relationship—including a set of predefined, and optionally mutually agreed upon, conditions that will be evaluated by the ad broker server 140 when a bid request is received to identify which if any of the collaborating advertisers will be selected to submit a bid in response to the received bid request.

In turn, the ad broker server 140 makes available to the advertisers 110 (including collaborating advertisers A 110-*a* and B 110-*b*) executable code (e.g., scripts in a language such as JAVASCRIPT), which the advertisers include in their web pages to track, monitor, and log data for various users 130 who visit their web pages.

During the subsequent set up (phase 2) of FIG. 3, the scripts made available to the various advertisers 110 (including advertisers A 110-*a* and B 110-*b*), and included in the web pages of those advertisers, log online web activity for users, such as the particular User M 130 depicted in FIG. 3. In the illustration of FIG. 3, User M 130 visits the web page for Advertiser A 110-*a* and performs 320 online activities on the web page for Advertiser A 110-*a*. The scripts made available to the ad broker server 140 to Advertiser A 110-*a*, and included in Advertiser A's web pages, log User M's online activity to generate data (e.g., user data 205) associated with User M 130. Such data may, for instance, correspond to User M's online exposure to or engagement with web content including commercial webpages, online representations of services or products having purchase or marketing information, online advertisements, or sponsored web content, and so on. The logged data for User M 130 is then relayed (e.g., by the scripts) to the ad broker server 140, which receives them 330.

At run time (phase 3), User M 130 visits 340 a web page that uses the ad exchange 120 to provide advertisements, thus creating an advertisement opportunity for advertising to User M 130. The ad exchange 120 notifies 350 the ad broker server 140 of the opportunity to bid for an advertisement to be presented to the viewing user. The notification may include information that identifies the viewing user, describes the context in which the advertisement is being displayed (trigger keywords, type of page, type of advertisement space), and the like. Upon receiving the bid request from the ad exchange 120, user ID mapping module 220 of the ad broker server 140 identifies User M 130 based on an ID matching by correlating User M's ID provided by the ad exchange with its own ID for User M using the mappings 209.

The ad broker server 140 retrieves logged data for User M 130 and analyzes the bid request and the logged data to identify advertisers whose advertising criteria are satisfied by the ad request. For example, if User M 130 previously visited the website for Advertiser A while shopping for shoes (as logged by the scripts on Advertiser A's web sites) and the ad targeting criteria for Advertisers A 110-*a* and B 110-*b* specify users interested in shoes, then a match is determined to exist and advertisers A 110-*a* and B 110-*b* are selected as candidates to submit a bid for the bid request.

The ad broker server 140 identifies collaborating advertisers A and B as satisfying the targeting criteria for the bid request, but also as having a pre-established "collaborative" relationship. Accordingly, the ad broker server then evaluates 360 the collaboration rules for the selected collaborating advertisers A and B to identify one of the two advertisers (e.g., preferentially) over the other to respond to the bid request based on the evaluated rules. In this example, the rules that are evaluated are the rules that were defined by Advertiser A 110-*a* since logged data for User M 130 was obtained (step 330) from Advertiser A 110-*a*. For instance, in the example of FIG. 3, the ad broker server determines that a portion of the retrieved logged data used to identify User M's historical ad engagement and exposure statistics was associated with (owned by, or obtained from) Advertiser A 110-*a* but not the Advertiser B 110-*b*. Therefore, in some embodiments, the rules that are applied are the rules defined by Advertiser A 110-*a*. Alternatively or in addition, based on the nature of the collaboration rules between Advertisers A 110-*a* and B 110-*b*, the ad broker server selects Advertiser A 110-*a* preferentially over Advertiser B 110-*b* for responding to the bid request since Advertiser A 110-*a* owned the received data (at step 330). Alternatively, the ad broker server, upon applying the rules of collaboration for Advertisers A and B, may determine that the received bid request satisfies conditions for forfeiture by Advertiser A and accordingly may select Advertiser B 110-*b* preferentially over Advertiser A 110-*a* for responding to the bid request, with Advertiser A instead receiving a payment $CW_B$ from Advertiser B to compensate for the forfeiture. In some embodiments, the rules of collaboration are allowed to be asymmetric between the two or more advertisers sharing a "collaboration" relationship. For example, Advertiser A's rules/conditions for forfeiting a bid opportunity to Advertiser B may be different from Advertiser B's rules for forfeiting a bid opportunity to A.

The ad broker server 140 then selects 370 a bid corresponding the selected advertiser and sends the selected bid to the ad exchange. To this end, the ad broker server may use factors such as bid value and likelihood of conversion. In this case, the factors are applied to the various advertisers 110 who remain candidates for the ad opportunity. (If Advertiser A were selected over Advertiser B in the above example, then Advertiser A would remain a candidate, but Advertiser B would not.)

Figure 4:
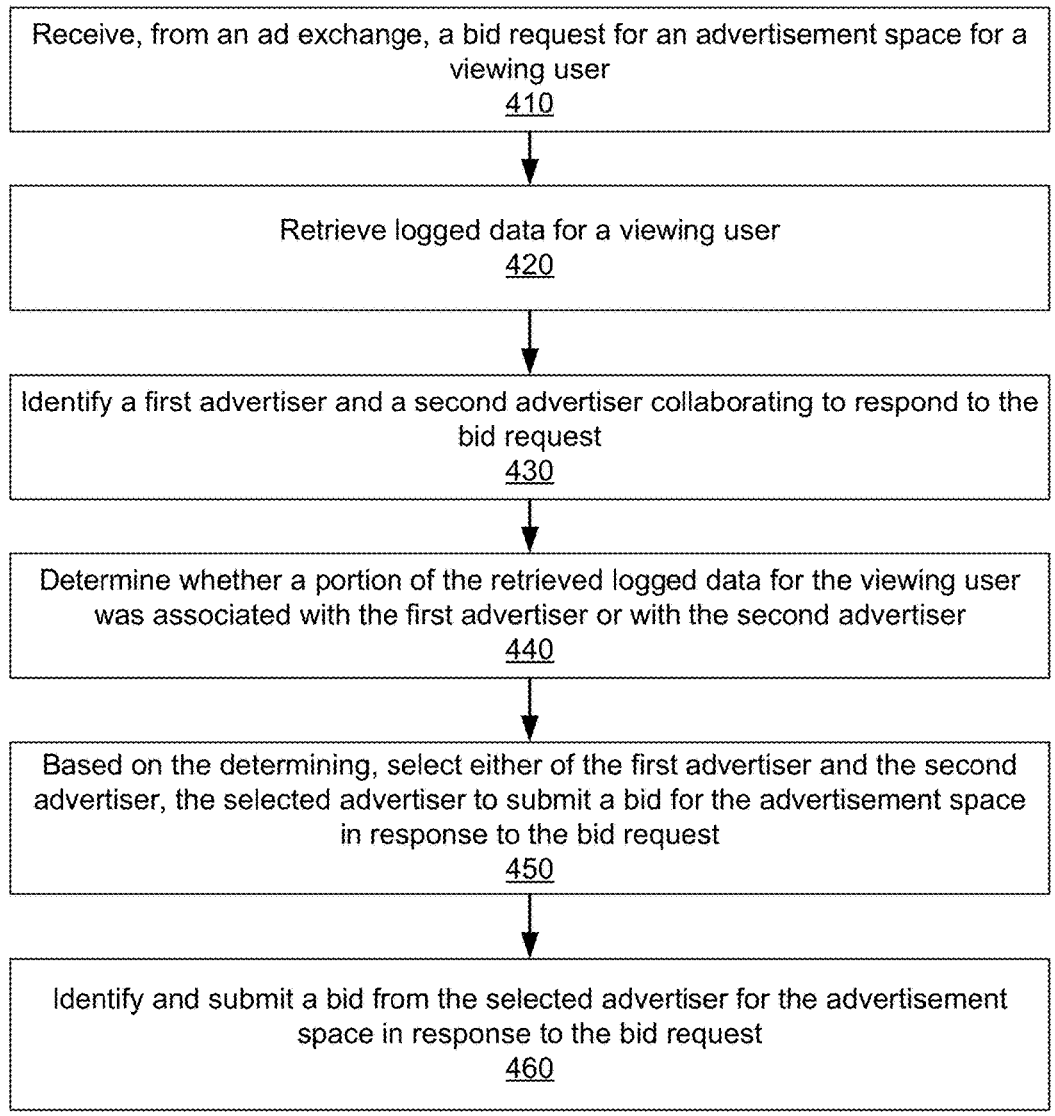
FIG. 4 is a flowchart illustrating the order of the operations performed by the various components of the ad broker server of FIG. 2, according to one embodiment.

FIG. 4 is a flowchart illustrating the order of the operations performed by the various components of the ad broker server 140 of FIG. 2, according to one embodiment. More specifically, FIG. 4 elaborates on various steps performed by the ad broker server 140 during the run-time phase (phase 3) of FIG. 3.

The ad broker server receives 410, from an ad exchange 120, a bid request for an advertisement space for a viewing user.

The ad broker server retrieves 420 logged data associated with the viewing user. In some embodiments, the logged data corresponds to the viewing user's online exposure to or engagement with web content including commercial webpages, online representations of services or products having purchase information, or online advertisements. Such data may be obtained from monitoring scripts provided by the ad broker server to various advertisers. In a most general case, the ad broker server receives, via such monitoring scripts made available to the one or more entities associated with a respective advertiser, logged data for multiple users; the logged data owned by the respective advertiser and the logged data including observations or statistics for the users' online activities in conjunction with the respective advertiser. This logged data may correspond to a viewing user purchasing products or engaging with ads for a respective advertiser's products, provided on a third party website or webpage or channel. For instance, if the respective advertiser is Brand A and the viewing user has purchased $374 dollars of Brand A goods over the past year, has viewed the Brand A product page 8 times, or has purchased an online coupon deal sponsored by Brand A by visiting the coupon deal provider's website, such data may be owned by Brand A or provided to Brand A, which in turn may transmit the data to the ad broker server.

In some embodiments, to retrieve logged data for the viewing user, the ad broker server performs ID matching to ascertain the identity of the viewing user. To this end, the ad broker server receives a user identifier from the ad exchange corresponding to the viewing user, accesses a previously stored mapping of user identifiers used by the ad exchange and identifiers known to one or more collaborating advertisers, the mapping stored via prior synchronization with the ad exchange, and identifies the viewing user based on a match between the user identifier obtained from the ad exchange and a user identifier in the previously stored mapping.

The ad broker server determines 430 that a first advertiser and a second advertiser have entered into an advertising collaborative relationship to respond to bid requests. In some embodiments, the ad broker server identifies the first advertiser and the second advertiser collaborating to respond to the bid request by analyzing the bid request to determine whether the bid request has attributes that match ad targeting criteria for both the first and second advertiser. Alternatively, or in addition, the ad broker server identifies the first advertiser and the second advertiser collaborating to respond to the bid request by analyzing the logged data for the viewing user to determine whether the bid request has attributes that match ad targeting criteria for both the first and the second advertisers. For example, if the viewing user previously visited the website for the first advertiser while shopping for shoes and the ad targeting criteria for the first and second advertisers specify demographics of users interested in shoes, then, a match is determined to exist based on an analysis of the bid request and the logged data for the viewing user. Accordingly, the first and second advertisers are selected to collaborate in responding to the bid request.

The ad broker server determines 440 whether a portion of the retrieved logged data for the viewing user was associated with (owned by) the first advertiser or with the second advertiser. For example, the ad broker server determines whether the data was either retrieved from or contains information about the viewing user's exposure to or engagement with the first advertiser or the second advertiser.

Based on the determining, the ad broker server selects 450 as an advertiser to submit a bid for the advertisement space in response to the bid request, one of the first advertiser and the second advertiser. In some embodiments, the ad broker server applies predefined collaboration rules in conjunction with the determination of step 440 (whether a portion of the retrieved logged data for the viewing user was associated with the first advertiser or with the second advertiser) to preferentially select one of the first and second advertisers over the other for responding to the bid request. In such embodiments, the predefined collaboration rules between two or more advertisers sharing a "collaboration" relationship include a set of mutually agreed upon and predefined conditions that are evaluated in response to a specified bid request, based on properties of the logged data for a respective user associated with the specified bid request, to identify which if any of the two or more advertisers would be selected to submit a bid in response to the specified bid request.

Two or more advertisers share a "collaboration" relationship, for instance, if the two or more advertisers are in a synergistic partnership relationship, by virtue of sharing logged data, submitting bid requests for similar ad spaces or ad campaigns, and advertising related products. Collaboration rules may define various selection criteria. For example, in one case, if the ad broker server determines that a portion of the retrieved logged data used to identify the viewing user's historical ad engagement and exposure statistics for the viewing user was associated with the first advertiser but not the second advertiser, then the ad broker server selects the first advertiser preferentially over the second advertiser for responding to the bid request. In a second case, if the ad broker server determines that a portion of the retrieved logged data used to identify the viewing user's historical ad engagement and exposure statistics for the viewing user was associated with the first advertiser but not the second advertiser and also establishes that the received bid request satisfies conditions for opportunity forfeiture by the first advertiser, then the ad broker server selects the second advertiser preferentially over the first advertiser for responding to the bid request despite the first advertiser being the owner of a portion of the retrieved logged data. For example, the collaboration rules may provide that an advertiser owning the data would forfeit an opportunity to submit a bid despite being associated with a portion of the retrieved logged data in lieu of a specified monetary remuneration from the advertiser selected to submit the bid in place of the forfeiting advertiser. For instance, the advertiser "owning" the data may set a minimum cost for sharing the data or forfeiting a bid opportunity, based on a calculation that by winning the threshold number of impressions specified in the bid request the advertiser is likely to make $5.00 from driving users back to their website, but could make $6.00 by forfeiting to another advertiser and being remunerated by them for the forfeiting.

The ad broker server identifies and submits 460 a bid from the selected advertiser for the advertisement space in response to the bid request. For example, the ad broker server selects an appropriate bid from the selected advertiser for the advertisement space in response to the bid request by analyzing the retrieved logged data for the viewing user to determine attributes of the bid based on the viewing user's historical ad engagement and exposure statistics contained in the retrieved logged data. Alternatively, or in addition, minimum bid values may be required or recommended to participate in the auction and may be evaluated against ranges of feasible bids provided by the first and the second advertisers to select an appropriate advertiser and/or bid.

Figure 5:
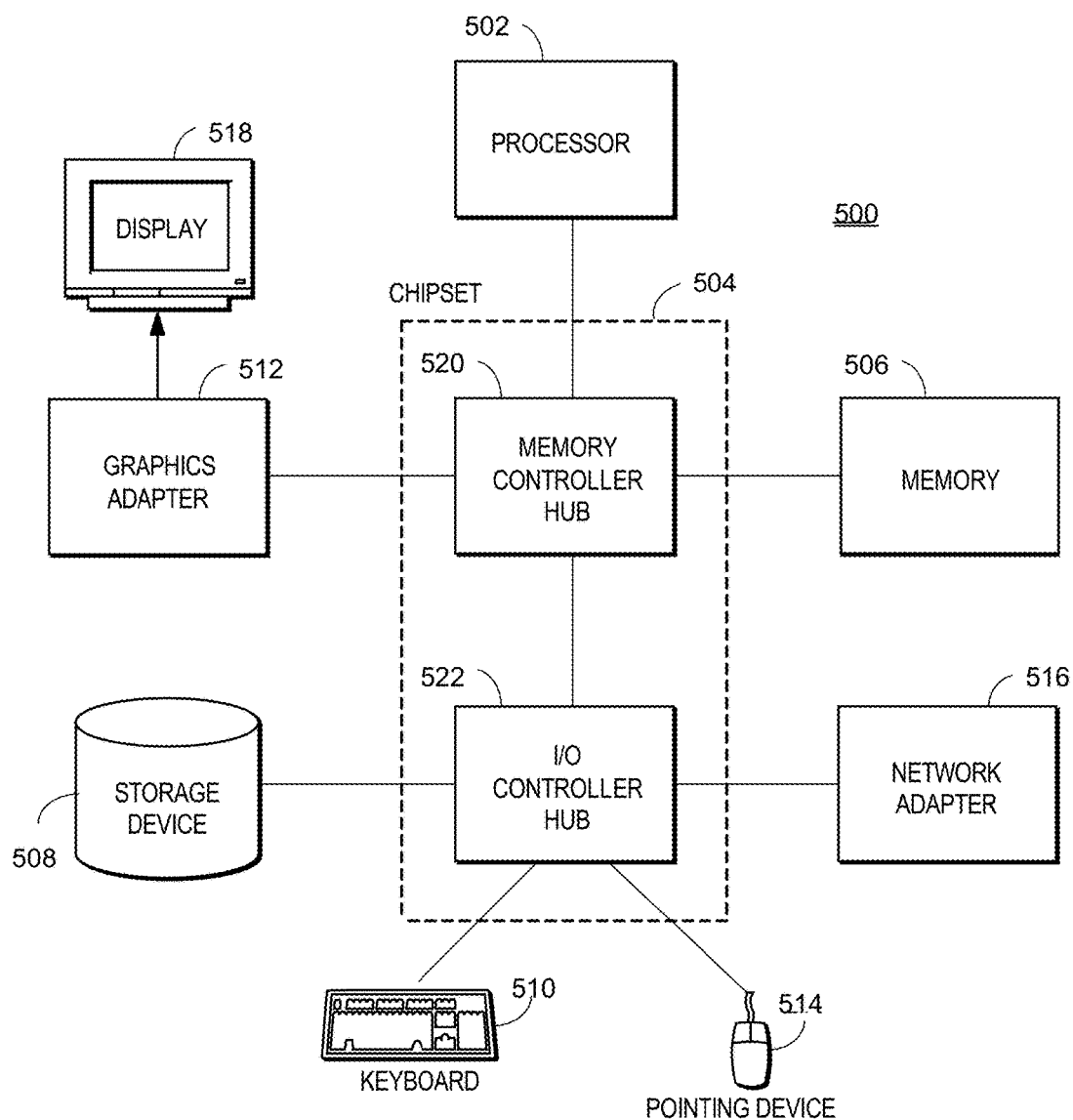
FIG. 5 is a high-level block diagram illustrating physical components of a computer used as part or all of the ad broker server, the advertiser, and/or the ad exchange from FIG. 1, according to one embodiment.

FIG. 5 is a high-level block diagram illustrating physical components of a computer 500 used as part or all of the advertiser 110, the ad exchange 120, and/or the ad broker server 140 from FIG. 1, according to one embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer 500. The graphics adapter 512 displays images and other information on the display 518. The network adapter 516 couples the computer system 500 to a local or wide area network.

As is known in the art, a computer 500 can have different and/or other components than those shown in FIG. 5. In addition, the computer 500 can lack certain illustrated components. In one embodiment, a computer 500 acting as a server may lack a keyboard 510, pointing device 514, graphics adapter 512, and/or display 518. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 6A:
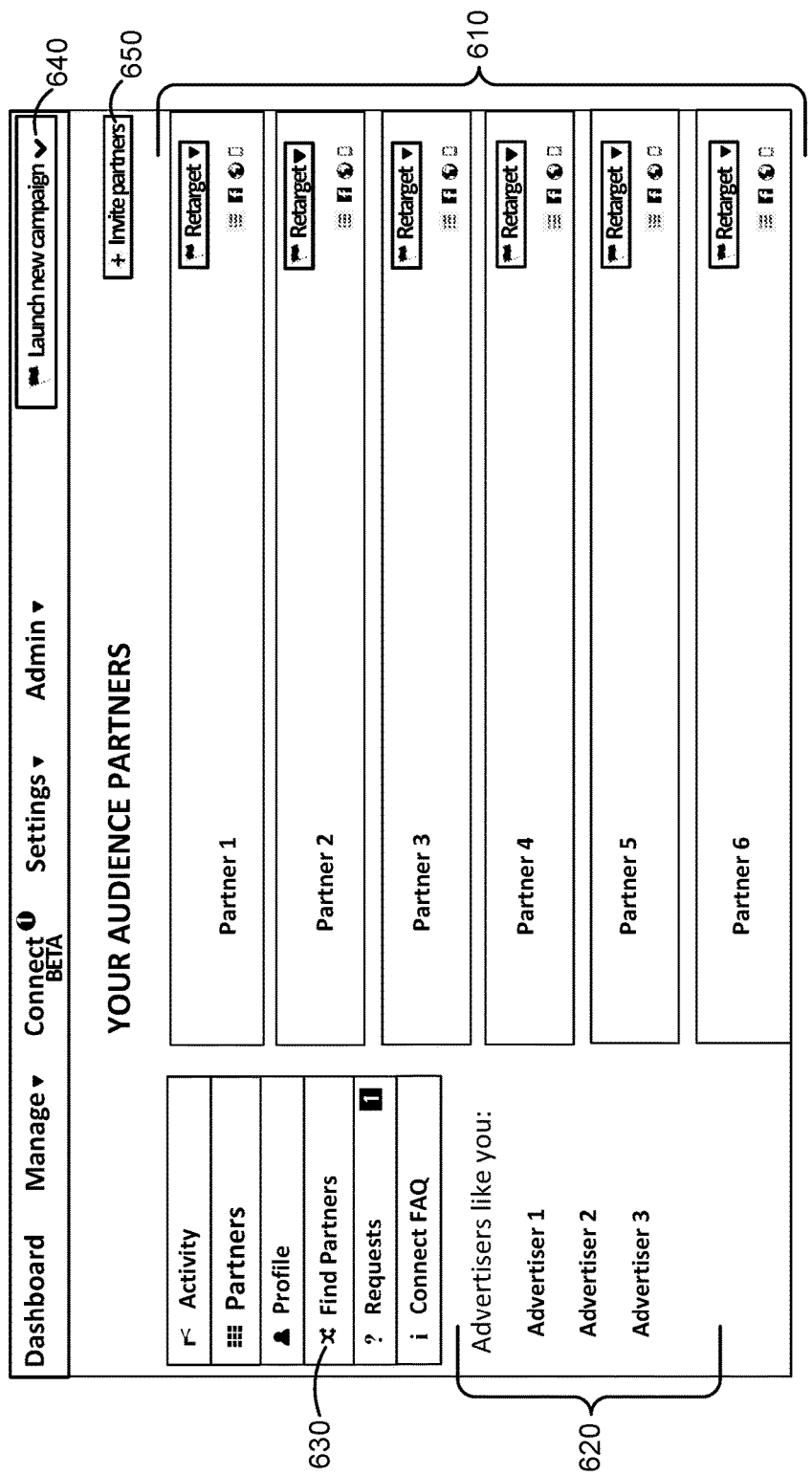
FIG. 6A-6B illustrate examples of a user interfaces presented on behalf of the ad broker server to advertisers during a set up phase of a collaborative relationship.
Figure 6B:
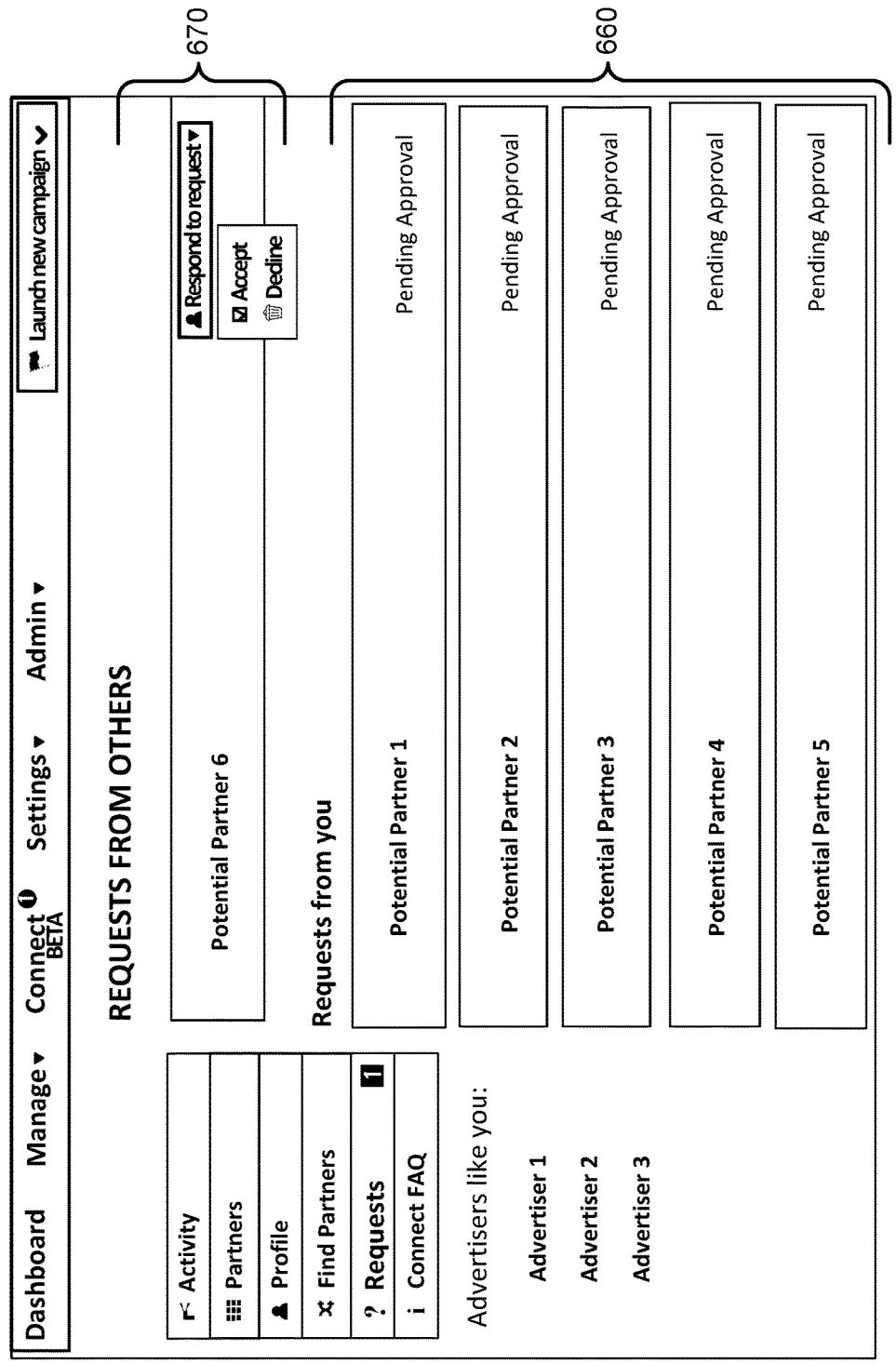

FIGS. 6A-6B illustrate examples of a user interfaces presented on behalf of the ad broker to an advertiser during a set up phase of a collaborative relationship.

As shown in FIG. 6A, a subject advertiser (e.g., the advertiser whose account profile is displayed in FIG. 6A) can view other collaborating advertisers 610 (referred to as 'partners' in FIG. 6A) with whom the subject advertiser has established collaboration relationships. The subject advertiser can be provided recommendations for potential advertisers 620 that the subject advertiser may be interested in or find financially beneficial to form collaboration relationships with (e.g., advertisers who may share similar characteristics as the subject advertiser). The subject advertiser may search for 630 other advertisers to form collaboration relationships with. The subject advertiser may launch 640 a new advertisement campaign, and designate (invite 650) collaborating advertisers to join an existing campaign or the join a newly created campaign.

FIG. 6B illustrates that a subject advertiser (e.g., the advertiser whose account profile is displayed in FIG. 6B) can interact with other advertisers by requesting the other advertisers (e.g., the list of advertisers 660) to form new collaboration relationships with the subject advertiser. When another advertiser accepts the subject advertiser's request to collaborate, a collaboration relationship is formed between the other advertiser and the subject advertiser. Alternatively, or in addition, other advertisers may designate the subject advertiser as a potential collaboration advertiser. The ad broker server 140 may then send a request for collaboration from the other advertiser(s) (as illustrated in item 670) to the subject advertiser; the subject advertiser may accept or decline the request for collaboration. Responsive to the subject advertiser accepting another advertiser's request to collaborate, a collaboration relationship is formed between the subject advertiser and the other advertiser.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A processor-implemented method performed by an ad broker server, the processor-implemented method comprising:
    receiving, by the ad broker server, from a first advertiser, collaboration rules specifying how the ad broker server determines which of the first advertiser and a second advertiser should submit a bid for an advertisement space;
    receiving, by the ad broker server, from an ad exchange, a bid request for a first advertisement space for a viewing user on a web page viewed by the viewing user;
    retrieving, by the ad broker server, logged data for the viewing user;
    determining, by the ad broker server, that the logged data was obtained at least in part from the first advertiser;
    determining, by the ad broker server, using the logged data, that the viewing user satisfies targeting criteria of the first advertiser and of the second advertiser;
    determining, by the ad broker server, that the first advertiser and the second advertiser have entered into an advertising collaborative relationship;
    identifying, by the ad broker server, the collaboration rules of the first advertiser for the advertising collaborative relationship;
    evaluating, by the ad broker server, the collaboration rules using the logged data; and
    based on the evaluating, selecting, by the ad broker server, either: the first advertiser to submit a bid for the advertisement space to the exclusion of the second advertiser, or the second advertiser to submit a bid for the advertisement space to the exclusion of the first advertiser.

2. The method of claim 1, wherein:
    the logged data corresponds to the viewing user's online exposure to web content including at least one of commercial webpages, online representations of services or products having purchase information, and online advertisements.

3. The method of claim 1, further comprising:
    receiving, via monitoring scripts made available to one or more entities associated with a respective advertiser, logged data for a plurality of users and owned by the respective advertiser, the logged data including statistics for the users' online activities in conjunction with the respective advertiser.

4. The method of claim 1, wherein retrieving logged data for the viewing user comprises:
    receiving from the ad exchange a user identifier corresponding to the viewing user;
    accessing a previously stored mapping between user identifiers used by the ad exchange and identifiers known to one or more collaborating advertisers, the mapping stored via prior synchronization with the ad exchange; and identifying the viewing user based on a match between the user identifier obtained from the ad exchange and a user identifier in the previously stored mapping.

5. The method of claim 1, wherein determining that a first advertiser and a second advertiser have entered into an advertising collaborating relationship to respond to bid requests comprises analyzing the bid request to determine whether the bid request has attributes that match ad targeting criteria for both the first and second advertisers.

6. The method of claim 1, further comprising computing an appropriate bid from the selected advertiser for the advertisement space in response to the bid request by analyzing the retrieved logged data for the viewing user to determine attributes of the bid based on the viewing user's historical ad engagement and exposure statistics contained in the retrieved logged data.

7. The method of claim 1, wherein:
the collaboration rules include a set of predefined conditions that are evaluated in response to the bid request based on properties of the logged data for the viewing user, to identify which if any of the first and second advertisers would be selected to submit a bid in response to the bid request.

8. The method of claim 1, wherein two or more advertisers share a collaborative relationship based on the two or more advertisers having performed at least one of:
sharing logged data, submitting bid requests for similar ad spaces or ad campaigns, and advertising related products.

9. The method of claim 1, further comprising:
determining that a portion of the retrieved logged data used to identify the viewing user's historical ad engagement and exposure statistics for the viewing user was associated with the first advertiser but not the second advertiser; and
in response, selecting the first advertiser preferentially over the second advertiser for responding to the bid request.

10. The method of claim 1, wherein:
evaluating the collaboration rules comprises:
determining that a portion of the retrieved logged data for the viewing user was associated with the first advertiser but not the second advertiser; and
establishing that the received bid request satisfies conditions for forfeiture by the first advertiser; and
the selecting comprises:
selecting the second advertiser to submit a bid for the advertisement space to the exclusion of the first advertiser.

11. The method of claim 1, wherein the bid request is an invitation for an advertiser to submit a bid for participation in an advertisement auction for the advertisement space for the viewing user.

12. The method of claim 1, further comprising:
sending, to the ad exchange, a bid for the advertisement space, wherein sending the bid is responsive to the selection.

13. An ad broker server comprising a processor and a non-transitory computer-readable storage medium storing instructions executable by the processor, the instructions comprising:
instructions for, receiving, by the ad broker server, from a first advertiser, collaboration rules specifying how the server determines which of the first advertiser and a second advertiser should submit a bid for an advertisement space;
instructions for, receiving, by the ad broker server, from an ad exchange, a bid request for a first advertisement space for a viewing user on a web page viewed by the viewing user, comprising an ad exchange user identifier;
instructions for, by the ad broker server, synchronizing cookies with the ad exchange to match the ad exchange user identifier to an ad broker user identifier;
instructions for, retrieving, by the ad broker server, logged data for the viewing user based on the matched ad broker user identifier;
instructions for, determining, by the ad broker server, that the logged data was obtained at least in part from the first advertiser;
instructions for, determining, by the ad broker server, using the logged data, that the viewing user satisfies targeting criteria of the first advertiser and of a second advertiser;
instructions for, determining, by the ad broker server, that the first advertiser and the second advertiser have entered into an advertising collaborative relationship;
instructions for, identifying, by the ad broker server, the collaboration rules of the first advertiser for the advertising collaborative relationship;
instructions for, evaluating, by the ad broker server, the collaboration rules using the logged data, the collaboration rules not taking into account advertisement spaces on the web page other than the first advertisement space; and
instructions for, by the ad broker server, based on the evaluating, selecting either: the first advertiser to submit a bid for the advertisement space to the exclusion of the second advertiser, or the second advertiser to submit a bid for the advertisement space to the exclusion of the first advertiser.

14. The non-transitory computer-readable storage medium of claim 13, wherein:
the logged data corresponds to the viewing user's online exposure to web content including at least one of commercial webpages, online representations of services or products having purchase information, and online advertisements.

15. The non-transitory computer-readable storage medium of claim 13, the instructions further comprising instructions for receiving via monitoring scripts made available to one or more entities associated with a respective advertiser, logged data for a plurality of users and owned by the respective advertiser, the logged data including statistics for the users' online activities in conjunction with the respective advertiser.

16. The non-transitory computer-readable storage medium of claim 13, wherein retrieving logged data for the viewing user comprises:
receiving from the ad exchange a user identifier corresponding to the viewing user;
accessing a previously stored mapping between user identifiers used by the ad exchange and identifiers known to one or more collaborating advertisers, the mapping stored via prior synchronization with the ad exchange; and
identifying the viewing user based on a match between the user identifier obtained from the ad exchange and a user identifier in the previously stored mapping.

17. The non-transitory computer-readable storage medium of claim 13, wherein determining that a first advertiser and a second advertiser have entered into an advertising collaborating relationship to respond to bid requests comprises analyzing the bid request to determine whether the bid request has attributes that match ad targeting criteria for both the first and second advertisers.

18. A processor-implemented method performed at an ad broker server, comprising:

receiving, by the ad broker server, from a first advertiser, collaboration rules specifying how the ad broker server determines which of the first advertiser and a second advertiser should submit a bid for an advertisement space;

receiving, by the ad broker server, from an ad exchange, a bid request for an advertisement space for a viewing user on a web page viewed by the viewing user;

retrieving, by the ad broker server, logged data associated with the viewing user;

determining, by the ad broker server, that the first advertiser and the second advertiser have entered into an advertising collaborative relationship to respond to bid requests;

determining, by the ad broker server, whether a portion of the retrieved logged data for the viewing user is associated with the first advertiser or with the second advertiser; and based on determining whether the portion of the retrieved logged data for the viewing user is associated with the first advertiser or with the second advertiser and on the collaboration rules, the collaboration rules not taking into account advertisement spaces on the web page other than the first advertisement space, selecting, by the ad broker server, as an advertiser to submit a bid for the advertisement space in response to the bid request, one of the first advertiser and the second advertiser, to the exclusion of the other.

19. The method of claim 18, wherein identifying the first advertiser and the second advertiser collaborating to respond to the bid request comprises analyzing the logged data for the viewing user to determine whether the bid request has attributes that match ad targeting criteria for both the first and the second advertisers.

20. The method of claim 18, wherein:

the logged data corresponds to the viewing user's online exposure to web content including at least one of commercial webpages, online representations of services or products having purchase information, and online advertisements.

* * * * *